United States Patent
Bury

(10) Patent No.: US 8,750,355 B2
(45) Date of Patent: Jun. 10, 2014

(54) METHOD AND ARRANGEMENT FOR ASYNCHRONOUS RSRP MEASUREMENT IN AN LTE UE RECEIVER

(75) Inventor: Andreas Bury, Dresden (DE)

(73) Assignee: Intel Mobile Communications Technology Dresden GmbH, Dresden (DE)

( * ) Notice: Subject to any disclaimer, the term of this patent is extended or adjusted under 35 U.S.C. 154(b) by 151 days.

(21) Appl. No.: 13/277,808

(22) Filed: Oct. 20, 2011

(65) Prior Publication Data

US 2012/0099632 A1    Apr. 26, 2012

(30) Foreign Application Priority Data

Oct. 20, 2010    (EP) ..................................... 10188153

(51) Int. Cl.
    *H04B 17/00*    (2006.01)
(52) U.S. Cl.
    USPC ............ 375/224; 375/260; 370/350; 370/203
(58) Field of Classification Search
    USPC ................................................. 375/224, 260
    See application file for complete search history.

(56) References Cited

U.S. PATENT DOCUMENTS

| 8,451,916 B2* | 5/2013 | Kwon et al. ................... 375/260 |
| 2002/0061118 A1* | 5/2002 | Tachibana et al. ............ 382/100 |
| 2006/0104257 A1* | 5/2006 | Laroia et al. ................... 370/350 |
| 2008/0310561 A1 | 12/2008 | Song et al. |
| 2012/0099632 A1* | 4/2012 | Bury ............................. 375/224 |

OTHER PUBLICATIONS

"A Low-Power All-Digital FSK Receiver for Space Applications", Eugene Grayver, et al., IEEE Transactions on Communications, vol. 49, No. 5, May 2001, pp. 911-921.

* cited by examiner

*Primary Examiner* — Eva Puente
(74) *Attorney, Agent, or Firm* — SpryIP, LLC

(57) ABSTRACT

In 3GPP LTE, user equipment must be able to report reference signal received power (RSRP) measurement to the serving cell's base station. A low-complexity method for asynchronous RSRP measurement in an LTE user equipment receiver is provided which includes frequency shifting the received signal so that the upper or lower half band becomes centered around the DC frequency; decimating the received signal to a width of $n \cdot 2^m$ samples, n being the reference symbol spacing in the received signal; dividing the samples into n sample vectors with a length of $2^m$ each, superimposing the n sample vectors; and performing FFT operation on the superimposed signal.

15 Claims, 5 Drawing Sheets

METHOD AND ARRANGEMENT FOR ASYNCHRONOUS RSRP MEASUREMENT IN AN LTE UE RECEIVER

CROSS REFERENCE TO RELATED APPLICATIONS

This application claims priority of European application No. 10188153.0 filed on Oct. 20, 2010, the entire contents of which is hereby incorporated by reference herein.

FIELD OF THE INVENTION

The invention relates to a method and arrangement for asynchronous RSRP measurement in an LTE UE receiver.

BACKGROUND OF THE INVENTION

FIG. 1 illustrates tasks that have to be performed by the physical layer of telecommunications user equipment (UE) according to the European Telecommunications Standards Institute (ETSI) 3GPP (3rd Generation Partnership Project) Long Term Evolution (LTE) standard.

When user equipment (UE) enters an LTE network, it has to perform cell search to detect the cell identifiers (IDs) of potential base stations that are referred to as enhanced node Bs (eNBs) in LTE terminology. Also it has to perform measurements on each detected cell and to report reference signal receive power (RSRP) and related Reference Signal Receive Quality (RSRQ). Once the UE has established a connection to an eNB, data reception is possible, and feedback information sent from the UE to the serving eNB helps to optimally utilize the bandwidth available to the eNB and to satisfy quality-of-service (QoS) requirements. Both feedback information as well as uplink payload data is sent via a "data transmission" block.

As shown in FIG. 1, a typical LTE UE implementation has to comprise computation resources for:

cell search (10): PSS (primary synchronization signal) and SSS (secondary synchronization signal) detection to determine cell IDs;

measurement (12): RSRP (reference signal receive power), RSRQ (reference signal receive quality);

data reception (14): PCFICH (physical control format indicator channel), PHICH (physical hybrid ARQ channel), PDCCH (physical downlink control channel), PDSCH (physical downlink shared channel), PMCH (physical downlink multicast channel);

feedback information computation (16): CQI (channel quality indicator), PMI (precoding matrix index), RI (rank indicator);

data transmission (18): PRACH (physical random access channel), PUCCH (physical uplink control channel), PUSCH (physical uplink shared channel).

According to ETSI TS 136 214 V8.7.0, section 5.1.1, "Reference signal received power (RSRP) is defined as the linear average over the power contributions (in Watts) of the resource elements that carry cell-specific reference signals within the considered measurement frequency bandwidth. For RSRP determination the cell-specific reference signals R0 according to ETSI TS 136 211 V8.9.0, section 6.10.1 shall be used. If the UE can reliably detect that R1 is available it may use R1 in addition to R0 to determine RSRP." ETSI TS 136 211 V8.9.0, section 6.10.1 defines cell-specific reference symbols as shown in FIG. 2. An eNB may utilize 1, 2, or 4 transmit (Tx) antennas, each sending a certain pattern of cell-specific reference symbols. R0 and R1 represent the mapping of reference symbols in a resource block for a first and second Tx antenna, respectively, such as defined by the cited standard for an eNB using two Tx antennas.

Each column in the time-frequency plane corresponds to subcarriers of one OFDM symbol. Each of the two rectangular schemes corresponds to one resource block, i.e. 12 subcarriers in frequency direction, and to 1 subframe, i.e. 2 slots, 1 millisecond in time direction, for the case of a normal cyclic prefix duration of 14 OFDM symbols. The shaded squares represent OFDM subcarriers carrying the cell-specific reference symbols, and the blank squares correspond to OFDM subcarriers carrying other kinds of symbols, mostly data symbols. The pattern shown in FIG. 2 is repeated in frequency direction to cover the actual transmission bandwidth. The total number of OFDM subcarriers in frequency direction may be up to 1200, for a system operating at 20 MHz bandwidth. This corresponds to 200 reference symbols in frequency direction, per Tx antenna. It is important to note that, within one OFDM symbol, these reference symbols are spaced equidistantly in frequency direction, respectively, for subcarriers below and above DC.

Since the DC carrier is left empty in LTE downlink signals (see ETSI TS 136 211 V8.9.0, section 6.12), this unused, inserted, DC carrier imposes a discontinuity in the otherwise equidistant reference symbol grid. The pattern illustrated in FIG. 2 is shifted in frequency direction in relation to the cell identifier (ID) associated with an eNB. Also different reference symbol modulation phase sequences are applied in dependence of the cell ID.

The frequency re-use factor in an LTE network is one, i.e., all eNBs operate at the same center frequency. The LTE standard does not foresee exact time synchronization between eNBs. Thus, a UE will receive superimposed signals from multiple base stations, with the respective frame structures mutually shifted in time and with respective reference symbol patterns as shown in FIG. 2 shifted to various positions in frequency direction.

Upon UE request, an eNB may permit a time pattern of so-called measurement gaps, which are intervals where a UE will never have to receive any data, which are left to the UE to be used for purposes like RSRP measurement. Configuration options are either 6 ms gap every 40 ms or 6 ms gap every 80 ms. During the gap duration, a UE implementation may utilize resources which are normally reserved for data reception, for other purposes, such as RSRP measurement. However, under certain circumstances an eNB may deny provision of measurement gaps. In a UE implementation this means that RSRP computation has to be performed concurrently with normal data reception. This means that resources from the data reception path will not be freed, and extra resources will be required for RSRP.

Intra-frequency measurement requirements are defined in ETSI TS 136133 V8.10.0, section 8.1.2.2. In particular, "when no measurement gaps are activated, the UE shall be capable of performing RSRP and RSRQ measurements for 8 identified intra-frequency cells, and the UE physical layer shall be capable of reporting measurements to higher layers with the measurement period of 200 ms". These 8 intra-frequency cells will typically be received at different synchronization times. To avoid inter-symbol interference (ISI), each synchronization time corresponds to a specific sample extraction and FFT. Thus, when the goal is to report one RSRP measurement per subframe (i.e., 8 cells over a period of 8 subframes), 4 extra FFT operations are needed per subframe—to extract reference symbols from 4 OFDM symbols—in addition to the 14 FFT operations needed for data reception of this subframe.

FIG. 3 shows a block diagram of a straightforward way to implement RSRP measurement functionality for one receive antenna. Basically, blocks 20 to 28 compute a set of channel estimates across the frequency band, and the results are squared and summed in block 30 in order to obtain a single RSRP value.

When using the straightforward implementation depicted in FIG. 3 for RSRP computation, only up to one third of the OFDM subcarriers are actually used after FFT, namely those which actually carry reference symbols, which is quite inefficient.

Due to LTE requirements, under continuous operation conditions without measurement gaps, a UE implementation will have to utilize dedicated resources for data reception (typically together with feedback information computation), and dedicated resources for measurement.

A problem in the described RSRP measurement is that received signals from eNBs of other cells arrive at various different time synchronizations at the UE, compared to the signal arriving from the serving cell eNB. The signal as received in the user equipment is a superposition of the signals received from all eNBs in the surrounding. To perform measurements on multiple cells, the UE has to process the received signal multiple times, which requires memory for buffering purposes as well as extra processing resources. RSRP measurement results from up to 8 neighboring eNBs must be reported simultaneously with data reception. To save energy, the complexity required for RSRP measurement must be kept low.

An object of the invention, therefore, is to provide a low complexity method for RSRP measurement in an LTE UE receiver.

SUMMARY OF THE INVENTION

According to the invention there is provided a method for measuring reference signal receive power for use in Long Term Evolution user equipment.

The method of the invention comprises the steps of extracting time samples from a received signal which signal comprises reference symbols having a predefined spacing of n subcarriers; performing a Fast Fourier Transform (FFT) operation on the extracted samples for transformation into the frequency domain; and extracting the reference symbols from the frequency domain samples to determine a reference signal receive power of the received signal, wherein the inventive method is characterized by the steps of frequency shifting the received signal so that the upper or lower half band becomes centered around the DC frequency; decimating the received signal to a width of n times a power of 2 samples wherein n corresponds to the reference symbol spacing in the received signal; extracting time samples from the decimated signal and frequency shifting the extracted time samples by a first discrete number of carriers such that one of the reference symbols falls to the DC frequency; combining the extracted time samples by dividing them into n sample vectors, each of which has a length equal to the subsequently applied FFT function, and superimposing the n sample vectors to obtain a single sample vector of a length equal to the subsequently applied FFT; and performing the FFT operation step on the superimposed signal to obtain a contiguous set of reference symbol carriers from a signal transmitted by one base station which are used to determine the reference signal receive power of a signal transmitted by that base station.

The method according to the invention exploits the structure of cell-specific reference symbol patterns in LTE which are equidistantly spaced in frequency direction to reduce FFT duration when measuring reference signal receive power and so provides for a significantly lower processing complexity when compared to RSRP measurement solutions that employ a full-size FFT.

BRIEF DESCRIPTION OF THE DRAWINGS

Additional features and advantages of the present invention will be apparent from the following detailed description of specific embodiments which is given by way of example only and in which reference will be made to the accompanying drawings, wherein.

DETAILED DESCRIPTION

Figure 3:
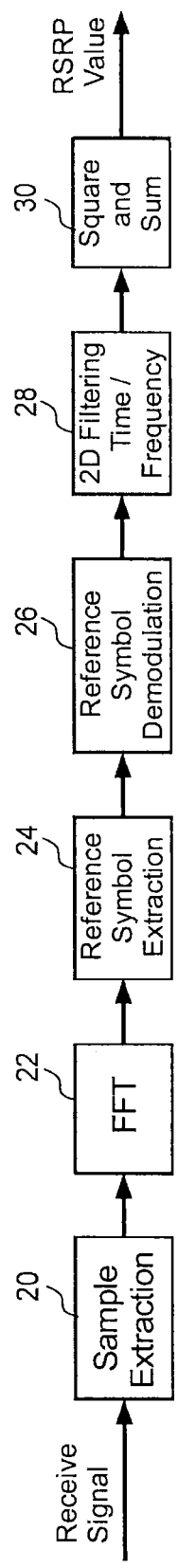
FIG. 3 shows a flow chart of general RSRP measurement functionality for one receive antenna.

FIG. 3 is a flow chart of general RSRP measurement functionality for one receive antenna. Time samples are extracted from the received signal, at 20, which comprises e.g. removal of a guard interval. At 22, an FFT is performed, for transformation from time into frequency domain. Reference symbols are extracted and demodulated, at 24 and 26, respectively, from the frequency domain signal, and a 2 dimensional filter function is applied to the demodulated reference symbols. Briefly stated, a set of channel estimates is computed across the frequency band, by blocks 20-28, and at 30, the results are squared and summed in order to obtain a single RSRP value.

When considering the 20 MHz bandwidth case (see ETSI TS 136 101 V8.10.0, section 5.6), the receiver would typically extract 2048 time samples for each OFDM symbol, at block 20, and would use an FFT with a length of 2048, at 22.

As mentioned above, reference symbols are equidistantly spaced in frequency direction, with a spacing of 3 or 6, depending on whether reference signals from one or two Tx antennas are present in an OFDM symbol. So only up to one third of the OFDM subcarriers would actually be extracted at step 24 and used for further processing, namely those which actually carry reference symbols.

The inventive approach targets at efficiently demodulating equidistantly spaced reference symbols within an OFDM symbol, and exploits the structure of cell-specific reference symbol patterns to reduce the size of FFT to demodulate reference symbols only, instead of using a full size FFT and reference symbol extraction.

Figure 4:
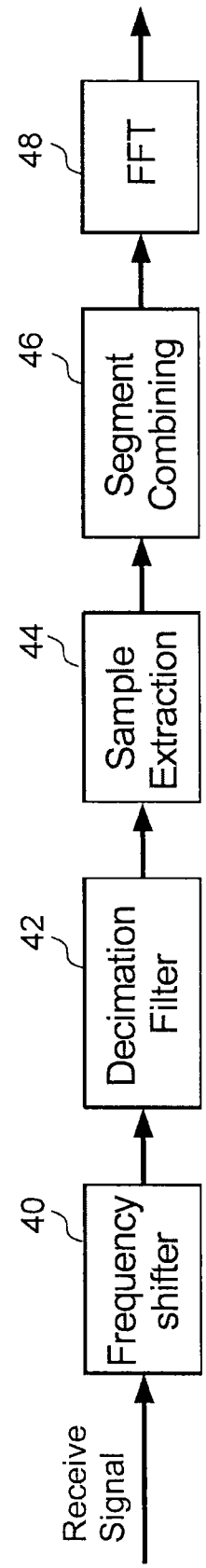
FIG. 4 illustrates signal processing for RSRP measurement according to the invention.
Figure 5:
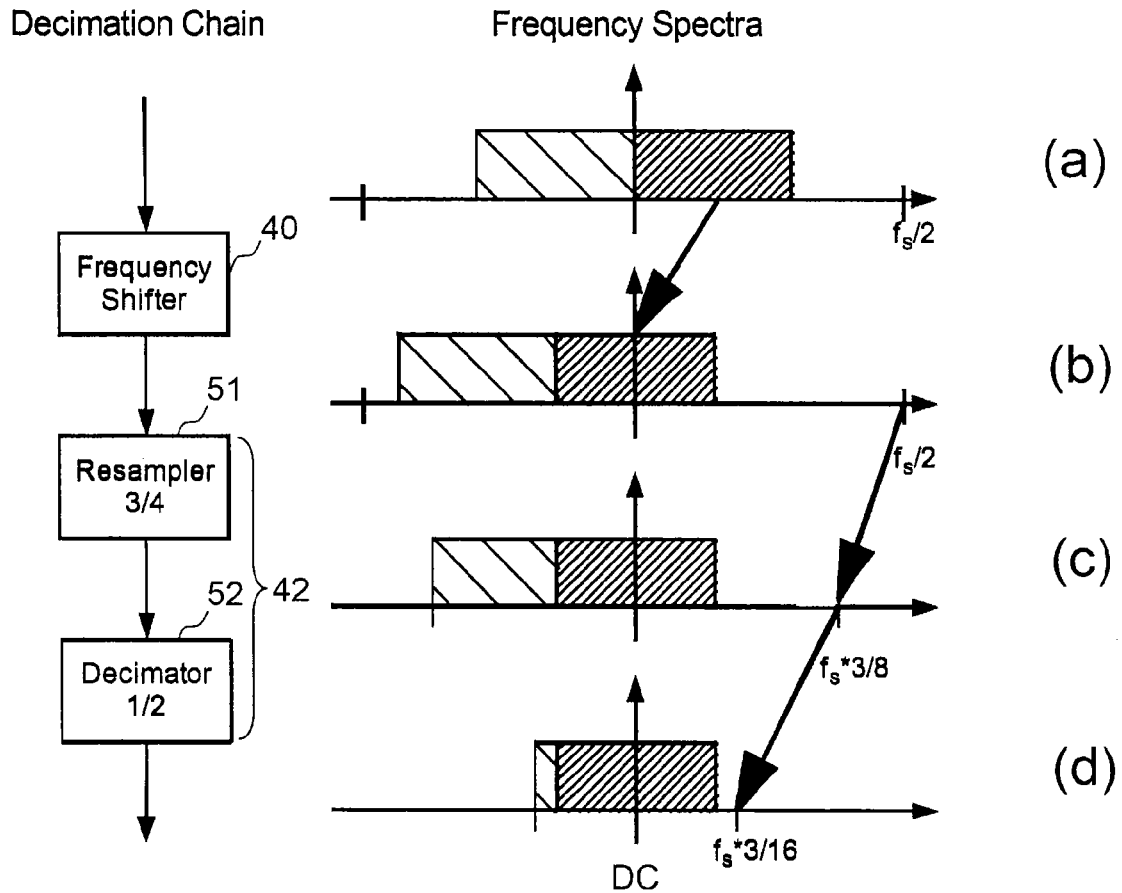
FIG. 5 illustrates one embodiment of a first part of the signal processing chain of FIG. 4.
Figure 6:
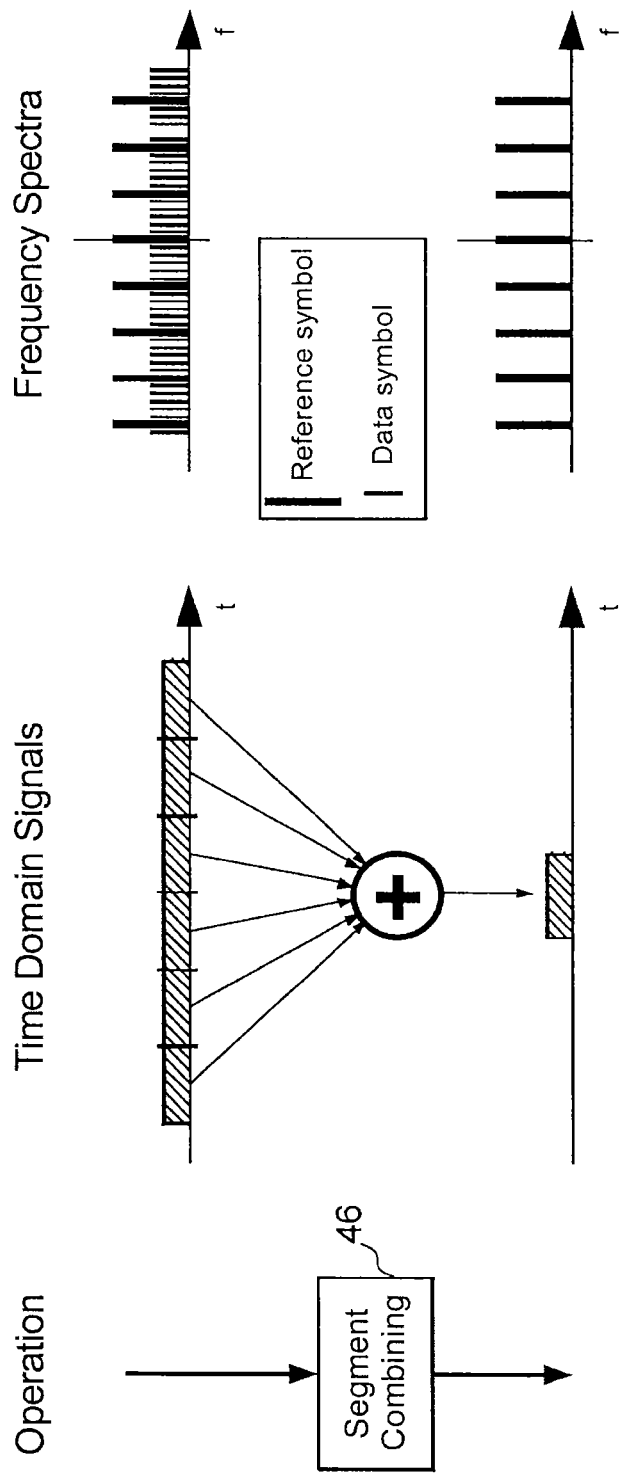
FIG. 6 illustrates details of one embodiment of another part of the signal processing chain of FIG. 4.

This will be explained below with reference to FIGS. 4 to 6, wherein FIG. 4 is a flow chart of signal processing for RSRP measurement according to the invention up to the FFT step; FIG. 5 illustrates the first two steps of FIG. 4; and FIG. 6 illustrates the combining step of FIG. 4.

The fact that the DC, i.e. the center frequency carrier, is unused in LTE, imposes a single irregularity on the equidistant spacing of reference symbols mentioned above.

To cope with this, only one half of the frequency band is processed at a time, either the half below or the half above the DC carrier. So at 40, the received signal is frequency shifted such that the upper or lower half band becomes centered around the DC frequency.

Preferably, the shifting direction is alternated in uniform periods, i.e. alternately the upper half and the lower half of the frequency band is use for RSRP measurement of a plurality of OFDM symbols. It is possible to switch the shifting direction for every OFDM symbol. In another embodiment, the shifting direction can be switched after each sub-frame. In a presently preferred embodiment, the shifting direction is switched after each slot, i.e. half sub-frame.

Figure 2:
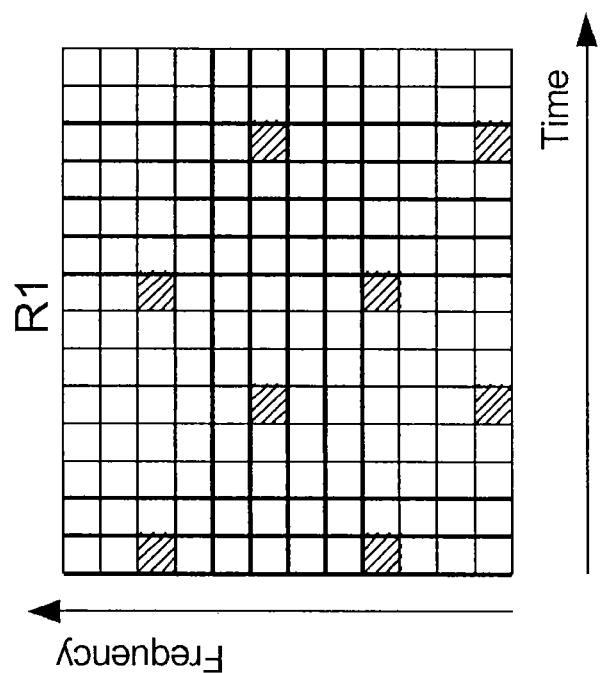
FIG. 2 illustrates mapping of reference symbols in the time-frequency plane.
Figure 2:
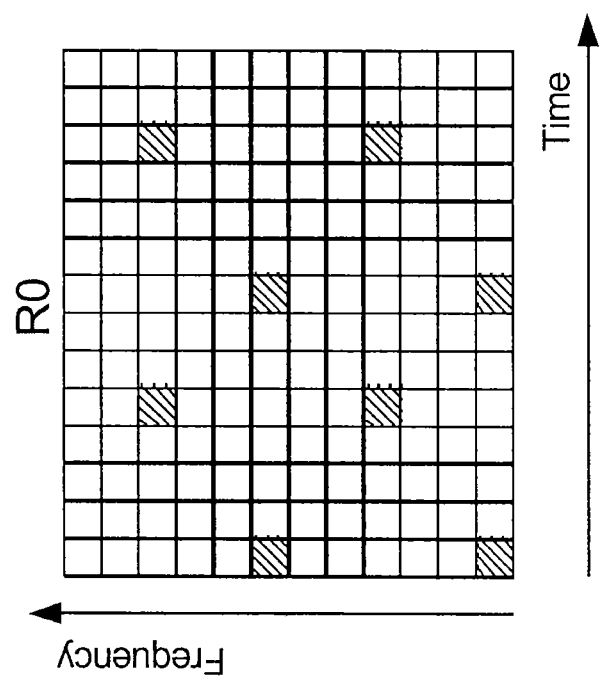

In a next step, at 42, the received signal is decimated to a width of n times a power of 2 ($n \cdot 2^m$) samples. Here, n corresponds to the reference symbol spacing in the received signal. In reference symbol patterns R0 and R1 shown in FIG. 2 the reference symbol spacing n is 6, such as defined by LTE standard for an eNB which uses two Tx antennas. It has to be understood that FIGS. 5 and 6 merely illustrate one preferred exemplary embodiment of the invention to help in thoroughly understanding the principle thereof. In particular, FIGS. 5 and 6 illustrate a preferred embodiment for a 20 MHz bandwidth case in which carriers from one Tx antenna have 200 reference symbols at a spacing of 6 subcarriers.

In FIG. 5, the received signal which is centered around the DC frequency, at (a), is shifted by frequency shifter unit 40 such that the positive half band is approximately centered around DC, at step (b). Then, the shifted signal is decimated by $3/4$, or by $3/4$ divided by an integer power of two.

In the presently preferred embodiment for the 20 MHz case as depicted in FIG. 5, decimation comprises a first decimation by $3/4$, at step (c), by resampler 51, and a subsequent decimation by $1/2$, at step (d), in decimator filter 52 which gives a total decimation by $3/8$. Note that Nyquist frequency is reduced accordingly to $3/16$ of the original sampling frequency, as depicted in FIG. 5.

Following decimation of step 42, an FFT with a length of $2048 * 3/8 = 768$ would be required to extract all 15 kHz wide subcarriers of upper or lower half bandwidth (above or below DC carrier).

However, the inventive approach now exploits the structure of cell-specific reference symbol patterns with an equidistant spacing n of reference symbols. FIG. 6 illustrates processing details of sample extraction 44 and segment combining 46 steps of FIG. 4. In particular, in order to extract only every $n^{th}$ subcarrier, the decimated signal is divided into n sample vectors, each of which has a length equal to the subsequently applied FFT function. In the illustrated example, in order to extract only every $6^{th}$ subcarrier, the decimated signal of 768 time-domain samples is split into 6 segments of 128 samples each. Then, these 6 segments are superimposed to obtain a single sample vector of length $2^m$, i.e. equal to the subsequently applied FFT. That is, in the illustrated embodiment one FFT duration consists of 128 time samples.

It will be clear to a person skilled in the art that one reference symbol subcarrier must be shifted to DC carrier, in order to extract reference symbols rather than data symbols, as shown at the right hand side in the scheme of FIG. 6. So step 44 comprises frequency shifting the time samples by a discrete number of subcarriers such that one of the reference symbols falls to the DC frequency.

Now the FFT operation step 48 is performed on the superimposed signal, and a contiguous set of reference symbol carriers is obtained which is used to determine the reference signal receive power of a signal from the base station which transmitted this signal.

As mentioned before in the introductory part, signals received from eNBs of other cells arrive at various different time synchronizations at the UE, compared to the signal arriving from the serving cell eNB. The signal as received in the user equipment is a superposition of the signals received from all eNBs in the surrounding.

That is, to perform measurements on multiple cells, the UE has to process the received signal multiple times.

For this purpose, in a preferred embodiment of the invention a decimated version of the received signal is stored, following step 44, in order to be processed multiple times for the different time-synchronizations of the different neighboring cells.

Figure 1:
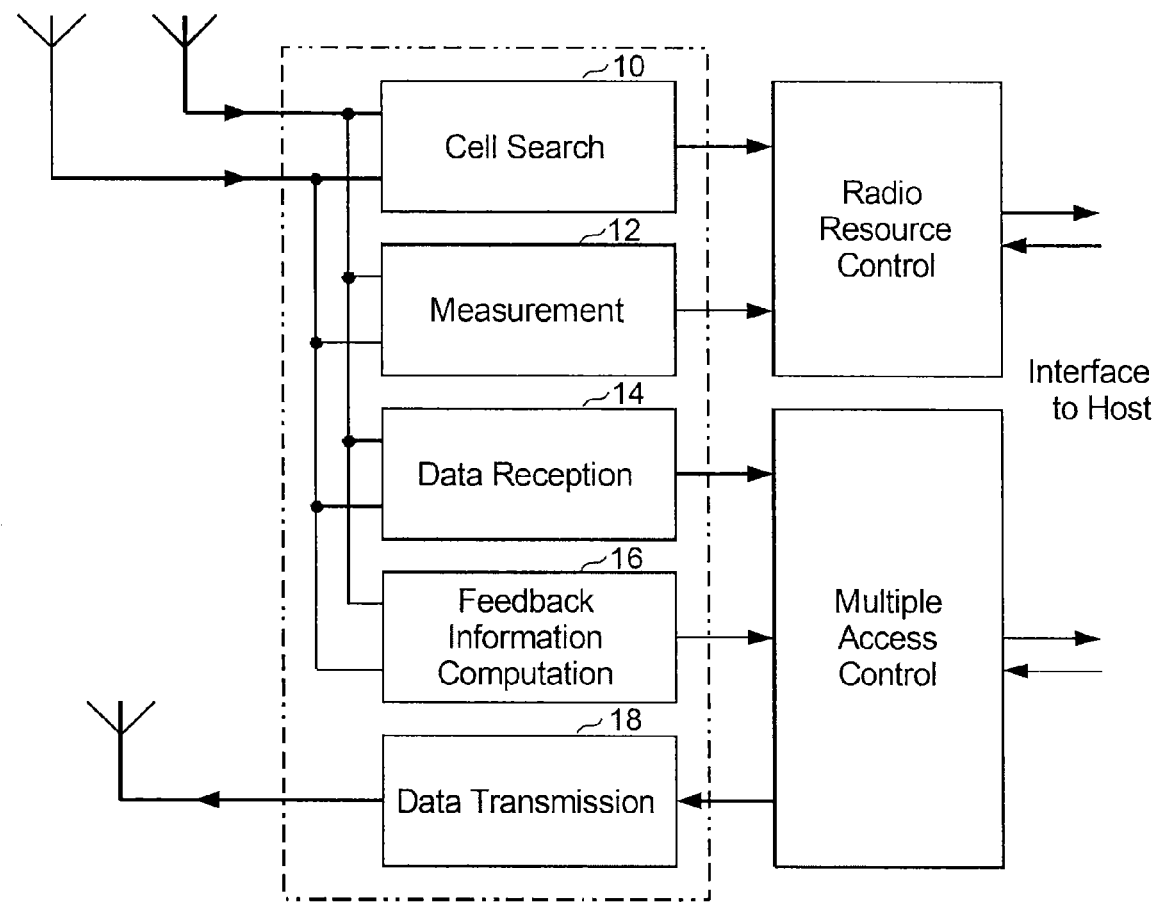
FIG. 1 illustrates tasks performed by the physical layer of an LTE user equipment receiver.

Moreover, a length-128 FFT is typically used for cell search and detection, i.e. in blocks 10 and 14 of FIG. 1. With the length-128 FFT of the preferred embodiment of RSRP measurement functionality according to the invention, the inventive method provides for an exceptionally efficient implementation of the physical layer of an UE, as cell search and measurement of up to 8 intra-frequency cells may be implemented using shared FFT resources. Thus the inventive method can be implemented re-using existing processing resources. In an implementation into an integrated circuit (IC) this re-use converts into smaller die size and thus lower cost.

The invention claimed is:

1. A method for measuring reference signal receive power for use in a Long Term Evolution user equipment, comprising the steps of:
    extracting time samples from a received signal that comprises reference symbols having a predefined spacing of n subcarriers;
    performing a Fast Fourier Transform (FFT) operation on the extracted samples for transformation into the frequency domain;
    extracting said reference symbols from the frequency domain samples to determine a reference signal receive power of the received signal;
    wherein the extracting time samples step, for each OFDM symbol, comprises:
    frequency shifting the received signal so that an upper or lower half band becomes centered around DC frequency;
    decimating the received signal to a width of $n \cdot 2^m$ samples per FFT duration of an OFDM symbol, wherein n corresponds to the reference symbol spacing as a number of OFDM subcarriers in the received signal and m is an integer;
    extracting time samples from the decimated signal and frequency shifting said extracted time samples by a first discrete number of carriers such that one of the reference symbols falls to the DC frequency; combining the extracted time samples by dividing them into n sample vectors, wherein each of the n sample vectors which has a length equal to the subsequently applied FFT operation, and superimposing said n sample vectors to obtain a single sample vector of a length equal to the subsequently applied FFT; and
    wherein said FFT operation step is performed on the superimposed signal to obtain a contiguous set of reference symbol carriers from a signal transmitted by one base station and the contiguous set of reference symbol carriers is used to determine the reference signal receive power of a signal transmitted by said base station.

2. The method of claim 1, wherein the decimating the received signal comprises decimation by $3/8$.

3. The method of claim 2, wherein said decimation by $3/8$ is split into decimation by $3/4$ and subsequent decimation by $1/2$.

4. The method of claim 2, wherein said decimation by $3/8$ is split into decimation by $1/2$ and subsequent decimation by $3/4$.

5. The method of claim 1, wherein the decimating the received signal comprises decimation by ¾.

6. The method of claim 1, wherein the method, following the decimating the received signal step, further comprises storing the decimated signal; and extracting time samples from the decimated signal and frequency shifting said extracted time samples by a second discrete number of carriers such that another one of the reference symbols falls to the DC frequency, for computing an RSRP value on the same decimated signal data for a different point in time to extract reference symbols from a signal transmitted by a second base station.

7. The method of claim 1, wherein the FFT step comprises performing an FFT with a length of a power of two.

8. The method of claim 7, wherein the FFT has a length of 128.

9. The method of claim 1, wherein, in the frequency shifting step of a half band to DC frequency, the shifting direction is alternated in uniform periods.

10. The method of claim 9, wherein the alternated period is one OFDM symbol.

11. The method of claim 9, wherein the alternated period is one sub-frame.

12. The method of claim 9, wherein the alternated period is one slot.

13. An arrangement for reference signal receive power measurement in a Long Term Evolution user equipment receiver, comprising:
    means for extracting time samples from a received signal which comprises reference symbols having a predefined spacing of n subcarriers;
    means for performing an FFT operation on the extracted time samples for transformation into the frequency domain;
    means for extracting said reference symbols from the frequency domain samples to determine a reference signal receive power of the received signal; wherein the extraction means comprise:
    frequency shifter means for frequency shifting the received signal so that the upper or lower half band becomes centered around DC frequency;
    decimation filter means for decimating the received signal to a width of $n \cdot 2^m$ samples per FFT duration of an OFDM symbol, wherein n corresponds to the reference symbol spacing as a number of OFDM subcarriers in the received signal and m is an integer;
    means for extracting time samples from the decimated signal and for frequency shifting said extracted time samples by a first discrete number of carriers such that one of the reference symbols falls to the DC frequency;
    means for combining the extracted time samples by dividing them into n sample vectors of a length of $2^m$ each, and for superimposing said n sample vectors to obtain a single sample vector of length $2^m$; and wherein FFT the operation is adapted for an FFT duration of $2^m$ time samples.

14. The arrangement of claim 13, further comprising memory means downstream the decimation filter means for buffering the decimated receive signal.

15. A Long Term Evolution user equipment receiver comprising at least cell searching means, reference measurement means, data reception means, feedback information computation means, and data transmission means; wherein said reference measurement means comprise an arrangement for reference signal receive power measurement according to claim 13, and wherein said cell searching means and said arrangement for reference signal receive power measurement share a Fast Fourier Transform unit.

\* \* \* \* \*